United States Patent [19]
Walter et al.

[11] 3,773,336
[45] Nov. 20, 1973

[54] SEALS FOR ROTATABLE MEMBERS

[75] Inventors: Gerhard W. H. Walter; Gunter E. W. Pietsch, both of Hamburg, Germany

[73] Assignee: Howaldtswerke-Deutsche Werft Aktiengesellschaft Hamburg und Kiel, Hamburg, Germany

[22] Filed: Feb. 17, 1971

[21] Appl. No.: 116,093

[30] Foreign Application Priority Data
June 10, 1970 Germany.................. P 20 28 427.9

[52] U.S. Cl.............................. 277/9, 277/58, 277/1, 277/187
[51] Int. Cl............................. F16j 9/00, F16l 21/02
[58] Field of Search....................... 277/9, 11, 1, 32, 277/58

[56] References Cited
UNITED STATES PATENTS

| | | | |
|---|---|---|---|
| 2,752,175 | 6/1956 | Fletcher | 277/34.3 X |
| 2,925,291 | 2/1960 | Bygbjerg | 277/9 X |
| 2,943,874 | 7/1960 | Valdi et al. | 277/34.3 |
| 3,166,330 | 1/1965 | Boutros | 277/9 X |
| 3,432,172 | 3/1969 | Hendrickson | 277/11 X |
| 3,434,727 | 3/1969 | Kollenberger | 277/187 X |
| 3,441,284 | 8/1969 | Murray et al. | 277/9 |
| 3,413,008 | 11/1968 | Greiner | 277/58 |
| 3,514,115 | 5/1970 | Gallo | 277/9 X |
| 3,563,555 | 2/1971 | Koons | 277/9 |

*Primary Examiner*—Samuel B. Rothberg
*Attorney*—Stevens, Davis, Miller & Mosher

[57] ABSTRACT

A seal for the shaft of a ship comprises a holder for two axially spaced sealing rings one of which first engages the rotatable part and the other is a spare ring which if the ring first engaging the rotatable part becomes defective can, by relative axial movement between the holder and the rotatable part, be moved into sealing relation with the rotatable member.

8 Claims, 8 Drawing Figures

SEALS FOR ROTATABLE MEMBERS

BACKGROUND OF THE INVENTION

1. Field of the Invention

This invention relates to seals for rotatable parts which have sealing rings acting on the rotatable parts.

2. Description of the Prior Art

Various constructions of seals are known which use sealing rings in the form of sleeves for rotatable parts, particularly for shafts, in which one or more sealing flanges are each provided with a retaining flange which terminates in an annular thickened portion which in each case is received in a recess provided in a stationary part of the casing and adapted to the cross-section of the annular thickened portion. Seals utilising such sealing rings have been proposed usually for sealing ship's shafts, as so-called stern tube seals, that is to say for use at those points where the propeller shaft projects into the interior of the ship or passes out of the hull, said shaft carrying at its outer end the ship's propeller or screw. In seals of this kind it is also known to provide an inner seal and an outer seal, each of which may have a plurality of axially spaced sealing rings of the kind referred to above.

Since seals of this kind are usually disposed at points to which access is difficult, in the event of the failure of the seal, for example through excessive wear of one or more sealing rings, it is difficult to replace it, and replacement necessitates considerable expenditure of time and labor, since a number of components for such seals must be removed before access can be gained to the sealing rings. Moreover, it is comparatively complicated for sealing rings of one-piece construction to be fitted to shafts when replacement is required.

It is a main object of the invention to provide a seal for a rotatable part, particularly for a shaft such as a ship's shaft, which in the event of the failure or wearing out of one or more of the sealing rings acting on the rotatable part can be rendered effective in a simple manner.

A further object of the invention is to provide a seal for sealing shafts, particularly ship's shafts (stern tube seal) which in the event of faults occurring or in the event of the failure of one sealing ring or set of sealing rings can be simply and quickly manipulated to render the seal effective without the necessity of dismantling and removing the defective seaing ring or rings.

SUMMARY

According to the invention there is provided a seal for a rotatable part, particularly for a ship's shaft, comprising at least one first sealing ring carried by a holder for initial co-operation with the rotatable part and at least one spare sealing ring carried by the holder in axially spaced relation with the first sealing ring or rings for co-operation with the rotatable part on a relative axial displacement between the rotatable part and the holder.

As will be hereinafter described the spare sealing ring or rings can be brought into the working position or positions thereof by a relative axial displacement between the rotatable part and the sealing ring holder in various ways.

The preferred field of application of the invention relates to seals for ship's shafts, access to which is well known to be comparatively difficult and the repair of which, particularly during travel, is extremely difficult if not impossible. The invention can be advantageously applied particularly to stern tube seals, both in the case of external stern tube seals and in the case of internal stern tube seals.

The particular advantage achieved through the invention consists, among other things, in that in the event of the failure of one or more sealing rings in seals, particularly for ship's shafts or propeller shafts, it is possible by a simple manipulation and without difficulty or loss of time to restore the original sealing action of the seal without any replacement parts being required.

DESCRIPTION OF THE PREFERRED EMBODIMENTS

Figure 1:
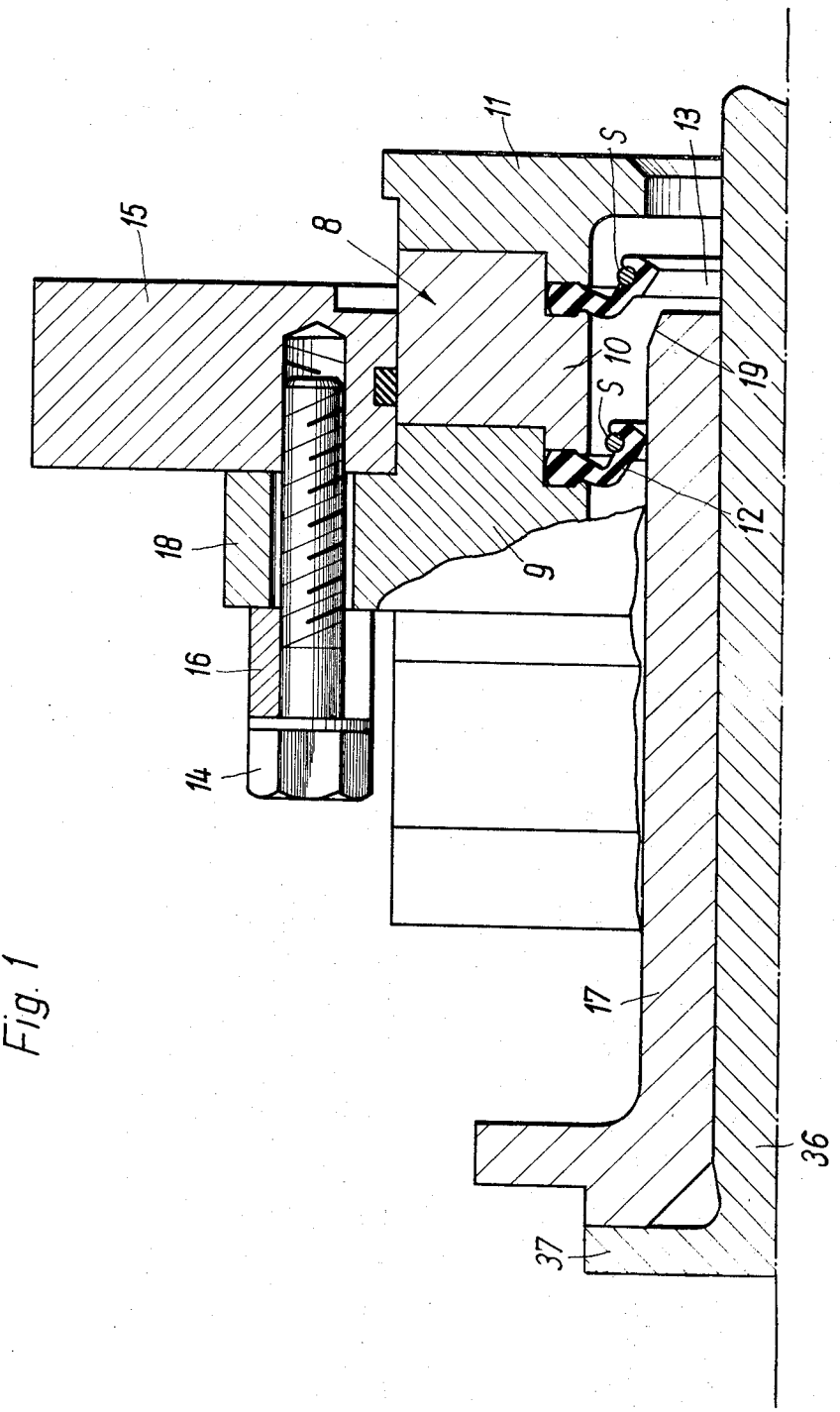
FIG. 1 is a partial section of a ship's stern tube seal with a bush disposed on a propeller shaft and, in its normal position, a sealing ring holder provided with a spare seal and adapted to slide relative to the shaft or bush.

The embodiments illustrated in the drawings relate particularly to ship's stern tube seals which are known in themselves and which for example comprise an outer and an inner stern tube seal with one or more sealing rings. Since seals of this kind are known, this type of seal will be explained only to the extent necessary for understanding the invention.

In the embodiment illustrated in FIG. 1 a sealing ring holder 8 is provided with annular flange parts 9, 10 and 11, between which there are disposed a first sealing ring 12, which initially acts on the rotatable part, and a spare sealing ring 13. As illustrated in the drawing the sealing rings are in the form of sleeve rings, a pointed bearing surface of which rests under tension on the rotatable part, the necessary bearing pressure being established by annular coil springs S. A holding flange formed integrally with the actual sealing ring adjoins the latter and ends in a thickened ring which is mounted without tension in two holder parts. For this purpose semi-circular recesses, in which the thickened rings of the sleeve sealing rings are received without tension, are formed in each holder part, or in corresponding intermediate parts. In the working position the holder parts surrounding the thickened ring abut directly against one another and are detachably made fast to one another, for example by threaded bolts. Mounting the thickened rings of the sleeve sealing rings without tension provides the advantage that no bending forces are transmitted to the holding flange and thus to the actual sealing ring. The sealing ring holder is fastened to a stationary part 15 by means of threaded bolts 14, of which only one is shown in the drawing. The bolts 14 pass through lugs 18 carried by the holder part 9 and between the outer side of the lug and the head of the bolt there is disposed a spacer member 16, which for example may in each case have the form of a U. In the normal working position the seal 12 acts as illustrated in FIG. 1 on the rotatable part, which here is a bush 17.

Figure 2:
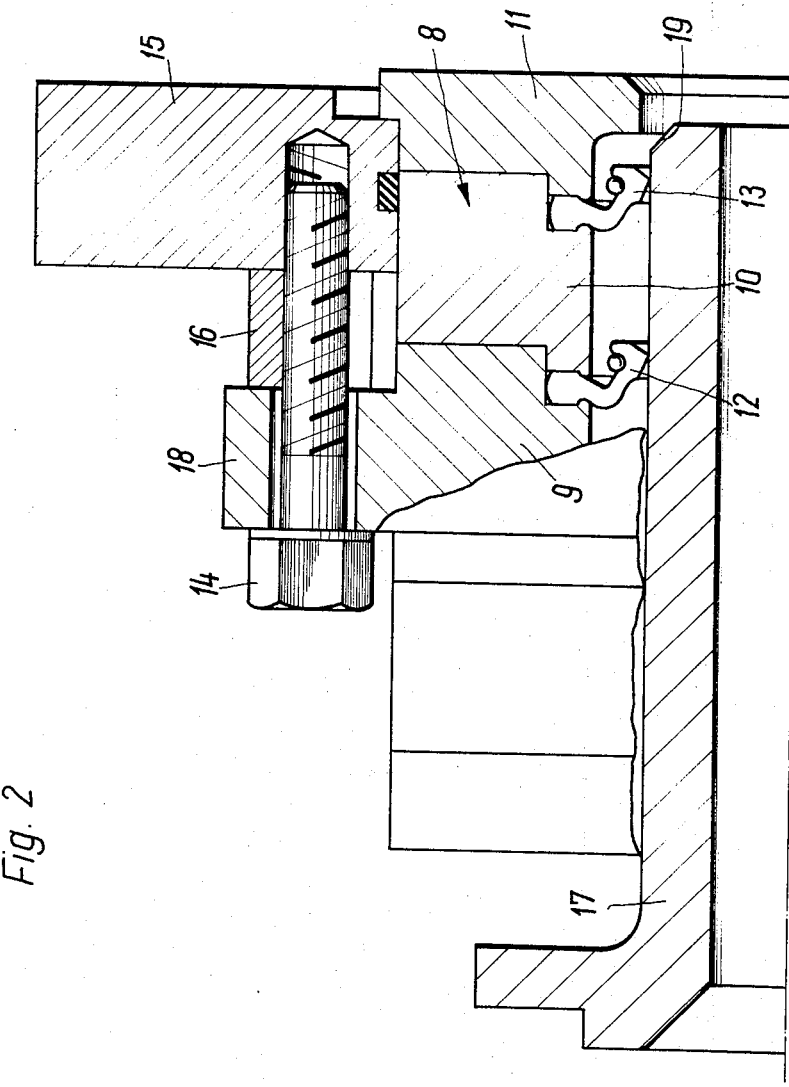
FIG. 2 is a partial section similar to that of FIG. 1 but with the sealing ring holder displaced relative to the bush or shaft.

If the first sealing ring 12 (or a plurality of sealing rings) should fail, the connection between the stationary part 15 and the sealing ring holder 8 is released by unscrewing the bolt 14 and, as shown in FIG. 2, locating the spacer member 16 between the lug 18 and the stationary part 15, so that the sealing ring holder together with the sealing ring is displaced axially along the rotatable part 17 a distance corresponding to the width of the spacer member 16. In this position the spare sealing ring 13 acts on the bush 17.

In order to facilitate the sliding of the spare sealing ring 13 over the bush 17, the end face of the bush 17 may be chamfered, as indicated at 19. The seal is then ready for use again.

Figure 3:
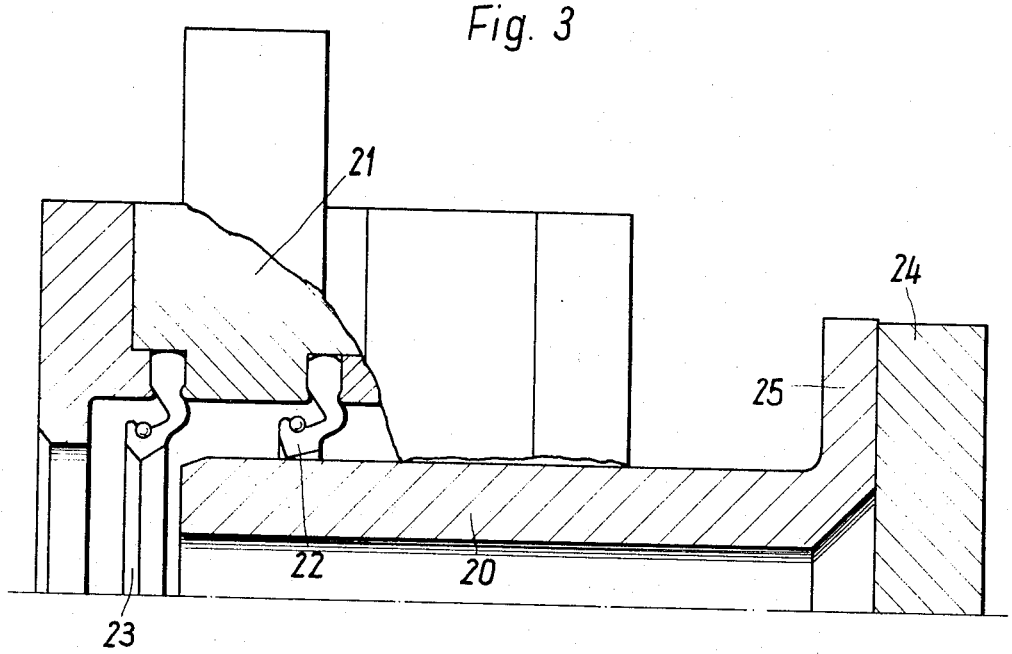
FIG. 3 is a partial cross-section of a modified form of construction with, in the normal position, a bush mounted for sliding relative to the stationary seal, and with a spare seal.
Figure 4:
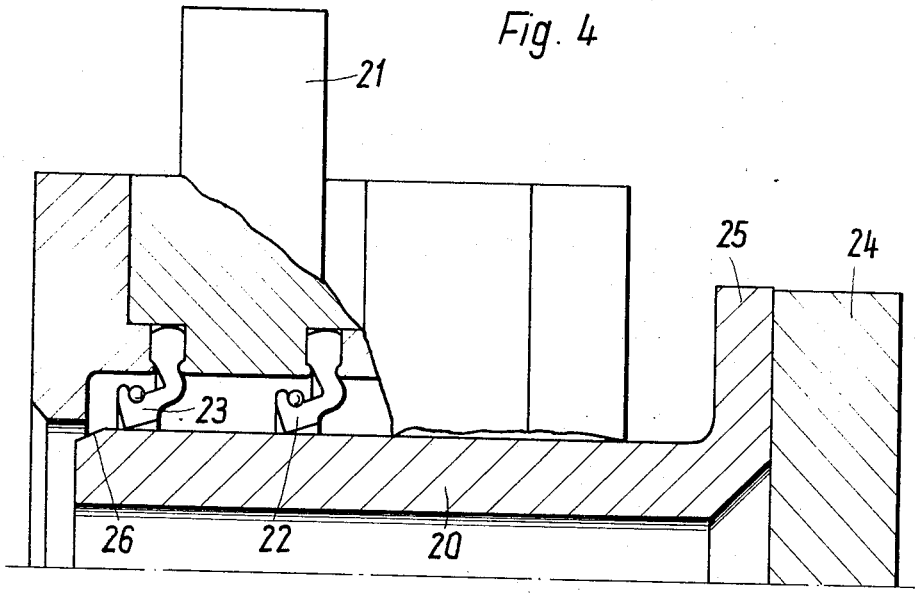
FIG. 4 is a view similar to that of FIG. 3, in which however the bush or the shaft and the bush is or are displaced relative to the stationary seal holder and the spare seal is situated in the working position.

In order to avoid displacement of the sealing ring holder, which is otherwise stationary, together with one or more sealing rings and one or more spare sealing rings, it is possible, as can be seen from the embodiment illustrated in FIGS. 3 and 4, for the rotatable part 20, for example in the form of a bush, to be made axially slidable in relation to a stationary sealing ring holder 21, a sealing ring 22, and a spare sealing ring 23. In the embodiment illustrated the bush 20 is for this purpose disposed for sliding on the shaft, for example the propeller shaft of a ship, and for this purpose a diagrammatically indicated adjusting ring 24 is provided, which acts on a flange 25 on the bush 20. When required, the adjusting ring 24 is detached from the rotatable part, for example the propeller shaft of a ship. The bush 20 together with the adjusting ring 24 is displaced axially on the shaft to the position shown in FIG. 4 and the adjusting ring 24 is refastened to the shaft, the spare sealing ring 23 now being in the working position. In order to facilitate the movement of the spare sealing ring 23, in this embodiment also a chamfer 26 may be provided on the bush 20.

Figure 5:
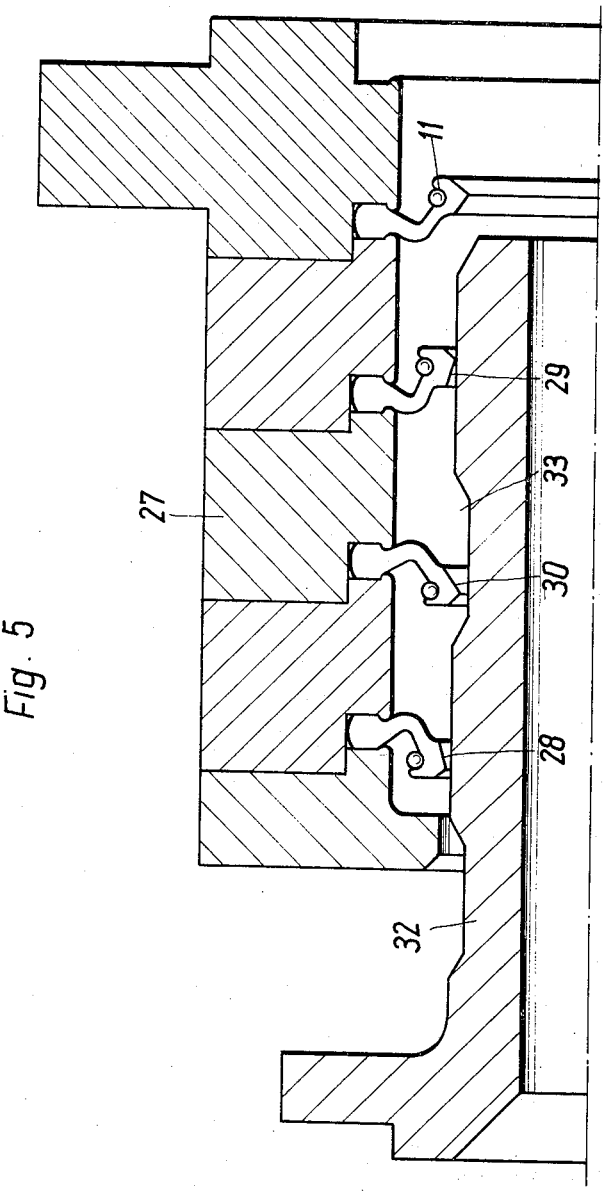
FIG. 5 shows another embodiment of the invention with a stationary sealing ring holder and a bush adapted to slide relative to the holder or to its sealing ring, with an alternating arrangement of the spare sealing ring and working sealing ring, in the working position.
Figure 6:
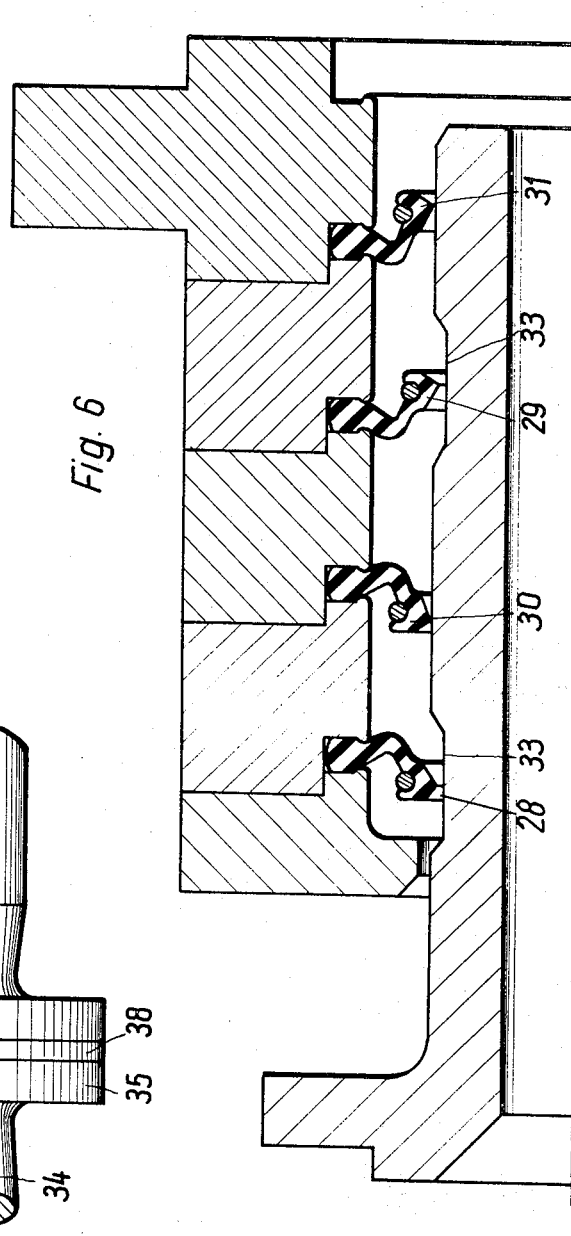
FIG. 6 is a section view corresponding to FIG. 5, but with a bush or bush and shaft displaced, the spare sealing rings being situated in the working position.

In the modified embodiment illustrated in FIGS. 5 and 6 a stationary sealing ring holder 27 is provided, which alternately carries sealing rings 28 and 29 and spare sealing rings 30 and 31. In the case of this embodiment the rotatable part is once again shown as a bush 32 on a shaft. In order to prevent the spare sealing ring or rings from acting directly on the rotatable part 32 when in its or their inoperative position, a recess 33 is provided on the bush 32 and one spare sealing ring 30 is disposed above said recess. In order to facilitate the running-up of the spare sealing ring or rings the recess or recesses 33 are provided with chamfers widening it obliquely outwards. FIG. 5 shows the seal in the normal working position, while FIG. 6 illustrates the working position of the spare sealing rings, in which the spare sealing rings 30 and 31 act on the periphery of the rotatable part (bush 32), while the working sealing rings 28 and 29 previously used are engaged in the recesses 33 but are disposed at a distance from the bottom of the latter.

Figure 7:
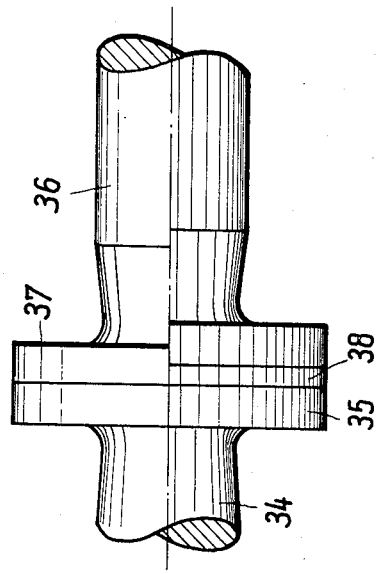
FIG. 7 shows part of a ship's shaft or shafting and a propeller shaft with a spacer between their connecting flanges.

FIG. 7 indicates the possibility of displacing a shaft, for example the propeller shaft of a ship, relative to the actual ship's shaft, a bush being disposed on the propeller shaft if desired. The ship's shaft is designated 34, its connecting flange 35, the propeller shaft 36, and its flange 37. Between the flanges 35 and 37 of the two shafts there is disposed a spacer member 38, which has a width corresponding to the length of the sliding movement of the shaft 36 together with its bush in relation to the stationary seal or stationary seals. (The seals themselves are not shown).

In the event of the failure of one or more sealing rings, the flanges 35 and 37 are released, the spacer member 38 taken out, and the shaft 36 moved a certain distance (to the left in the drawing), and the connection is restored (top half of FIG. 7). The spare sealing ring or spare sealing rings then acts or act on the shaft 36 or on the bush, which was displaced with it, in the working position.

Figure 8:
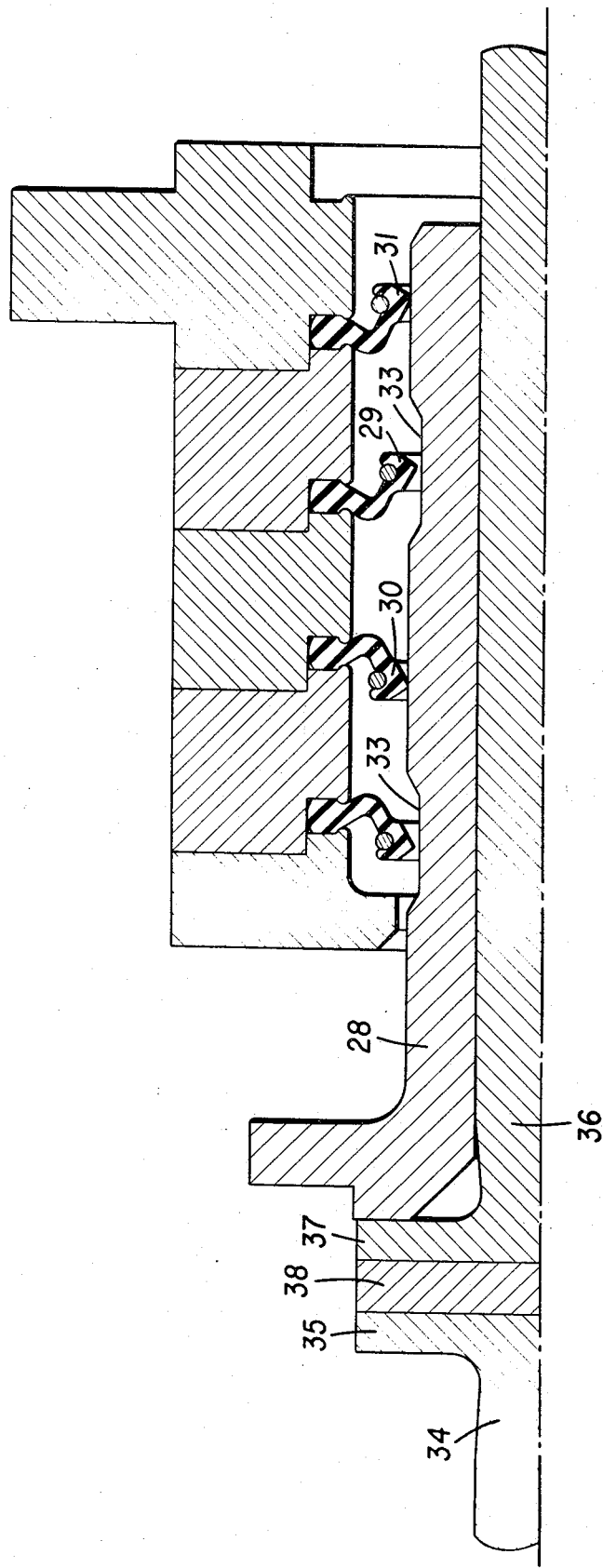
FIG. 8 is a sectional view similar to FIG. 6, additionally showing the ship's shaft, propeller shaft and spacer, as shown in FIG. 7.

The elements of FIGS. 5-7 are shown in combination in FIG. 8.

In all embodiments it is possible, by suitable selection of the spacer member 16 according to FIG. 1, or the width of the spacer member 38 between the two shafts, or the length of the sliding movement of the bush on the shaft, to give the spare sealing ring or rings a position relative to the working sealing rings such that they now act on the shaft or bush in a different position from the point at which the sealing ring or rings acted previously.

We Claim:
1. A seal for a rotatable shaft, comprising:
   a plurality of radial lip sealing rings coaxially arranged on a carrier in spaced relationship with one another,
   a shaft extending through said rings and carrier, coaxial to said rings, said carrier and shaft being axially displaceable relation to each other,
   said shaft including a bushing portion wherein the axial portion of said bushing portion opposite at least one of said sealing rings has a smaller diameter than a diameter which can be effectively sealed by said rings, said one ring being in an inoperative position with respect to said bushing portion, and wherein the axial portion of said bushing portion opposite at least one other of said sealing rings has a larger diameter which can be effectively sealed by said sealing rings, said other ring being in an operative position with respect to said bushing portion of said shaft.
2. The seal of claim 1 wherein said bushing portion is a bushing sleeve separate from but attached to said shaft.
3. The seal of claim 1 additionally comprising means for axially displacing said carrier with respect to said shaft.
4. The seal of claim 3, wherein said displacing means comprises a spacer for mounting between the carrier and the mount to which said carrier is attached.

5. The seal of claim 3, wherein said shaft comprises two co-axially connected longitudinal sections, and said displacing means comprises a spacer for mounting between the two shaft sections.

6. The seal of claim 1, wherein the surface of the bushing portion of the shaft is chamfered between the smaller diameter and larger diameter axial portions.

7. The seal of claim 1, wherein said carrier carries at least one spare sealing ring between two other sealing rings, said spare sealing ring in an inoperative position concentric to a smaller diameter axial portion of said bushing portion.

8. The seal of claim 3, comprising at least one operative sealing ring and at least one inoperative spare sealing ring arranged at a fixed spacing from one another, and said displacing means has an axial displacement length which is different from the spacing between said operative and spare sealing rings.

* * * * *